United States Patent
Buehler et al.

(10) Patent No.: US 9,356,493 B2
(45) Date of Patent: May 31, 2016

(54) METHOD OF MAKING A MOTOR HOUSING ASSEMBLY

(71) Applicant: GM GLOBAL TECHNOLOGY OPERATIONS LLC, Detroit, MI (US)

(72) Inventors: Charles K. Buehler, Lansing, MI (US); Nieyuan Hai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 495 days.

(21) Appl. No.: 13/776,776

(22) Filed: Feb. 26, 2013

(65) Prior Publication Data

US 2014/0239753 A1   Aug. 28, 2014

(51) Int. Cl.
*H02K 15/03*   (2006.01)
*H02K 9/22*   (2006.01)

(52) U.S. Cl.
CPC ........................................ *H02K 9/22* (2013.01)

(58) Field of Classification Search
CPC ....... H02K 9/22; H02K 1/2773; H02K 15/03; Y02T 10/641
USPC ............ 29/506–598; 310/63–65, 89; 264/261
See application file for complete search history.

(56) References Cited

U.S. PATENT DOCUMENTS

| | | | | |
|---|---|---|---|---|
| 2,967,346 A * | 1/1961 | McMaster et al. | ............... | 29/596 |
| 4,862,582 A * | 9/1989 | Henck | ............................. | 29/596 |
| 4,963,776 A * | 10/1990 | Kitamura | ................ | H02K 9/22 310/216.137 |
| 5,038,460 A * | 8/1991 | Ide et al. | ........................ | 29/596 |
| 5,584,114 A * | 12/1996 | McManus | ....................... | 29/596 |
| 5,727,307 A * | 3/1998 | Gstohl et al. | .................... | 29/597 |
| 6,058,593 A * | 5/2000 | Siess | ................................ | 29/596 |
| 8,020,280 B2 * | 9/2011 | Fukumaru et al. | ............. | 29/598 |
| 2009/0152962 A1 * | 6/2009 | Gasser et al. | ................... | 310/43 |
| 2011/0025147 A1 * | 2/2011 | Owng et al. | .................... | 310/63 |
| 2012/0011949 A1 | 1/2012 | Rosengren et al. | | |
| 2014/0239753 A1 * | 8/2014 | Buehler et al. | .................. | 310/52 |
| 2014/0319936 A1 * | 10/2014 | Makino et al. | .................. | 310/43 |

FOREIGN PATENT DOCUMENTS

| | | |
|---|---|---|
| CN | 1296325 A | 5/2001 |
| CN | 102906972 A | 1/2013 |
| EP | 0327338 A2 | 8/1989 |
| GB | 2293695 A | 4/1996 |
| JP | S6028755 A | 2/1985 |
| JP | 2001264077 A | 9/2001 |
| JP | 2007236045 A | 9/2007 |
| KR | 101055009 B1 | 8/2011 |

* cited by examiner

*Primary Examiner* — Minh Trinh
(74) *Attorney, Agent, or Firm* — Quinn Law Group, PLLC

(57) ABSTRACT

A motor housing assembly is formed by positioning a stator relative to a motor housing to configure a fillable gap between the stator and the motor housing, and filling the fillable gap is at least partially with a polymeric material to form a thermally conductive layer. The polymeric material may include a metallic filler material. The thermally conductive layer is in contact with an exterior surface of the stator and an interior surface of the motor housing adjacent the exterior surface of the stator, and is configured to cover at least half of the exterior surface. A method to form the thermally conductive layer includes injecting a high flow polymeric material through a port defined by the housing and in fluid communication with the fillable gap.

6 Claims, 3 Drawing Sheets

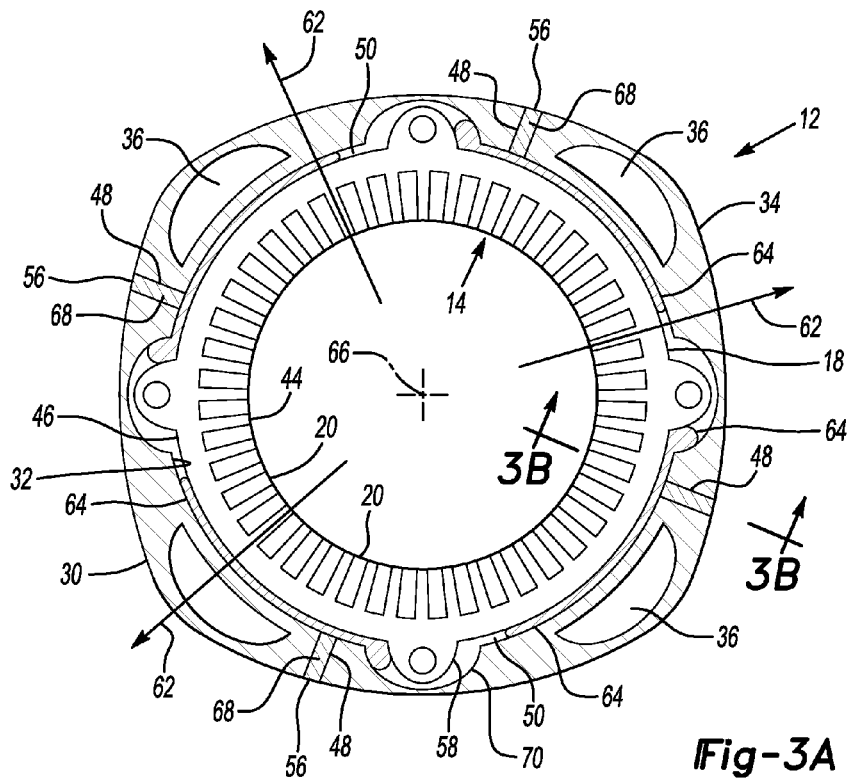
*Fig-3A*
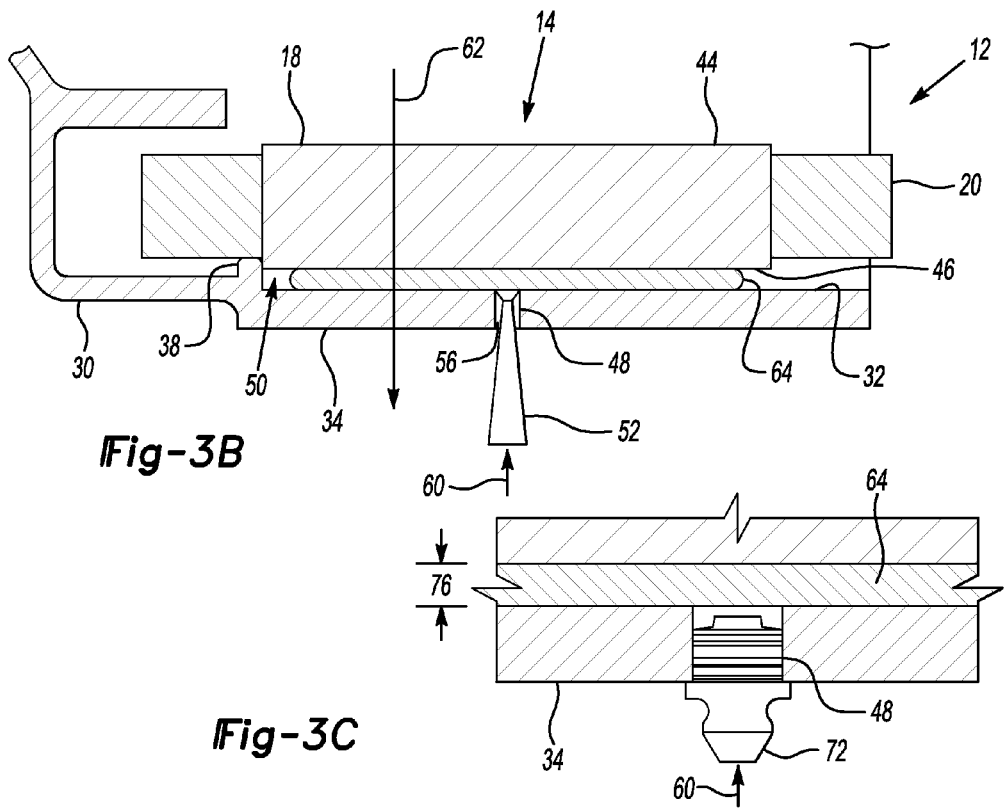
*Fig-3B*
*Fig-3C*

METHOD OF MAKING A MOTOR HOUSING ASSEMBLY

TECHNICAL FIELD

The present invention relates to a motor housing assembly including a stator and a method of making the motor housing assembly.

BACKGROUND

Thermal conduction of heat from a motor during motor operation is required to maintain a motor operating temperature which is not detrimental to the motor or motor components. Heat transfer from a motor may be restricted by one or more clearance gaps or air spaces between components of the motor, such as between a stator and a motor housing, which reduce heat transfer from the motor due to the poor thermal conductivity, e.g., the insulating properties, of the air present in the gap or space.

Elevated operating temperatures may affect motor efficiency by increasing the energy input required to generate torque output, or may affect motor performance or durability by thermally stressing the motor and increasing the potential for thermal fatigue of motor components such as windings. Motor control systems may be configured to monitor motor temperature and to restrict motor output to a maximum torque limit to prevent overheating of the motor in situations where heat transfer is insufficient to maintain the operating temperature of the motor below a temperature limit.

SUMMARY

Improving heat transfer from the motor can result in benefits to motor performance including improved motor efficiency and durability, decreased potential for overheating and thermal stress, and an increase in the operating torque limit of the motor. A motor housing assembly including a stator is provided which includes a thermally conductive material configured to transfer heat from the stator to the motor housing, to improve heat transfer from the motor, thereby improving motor efficiency. In one example, the thermally conductive material may be configured as a thermally conductive layer interposed between the stator and the motor housing and formed to displace air from a fillable gap defined by the stator and motor housing. As described herein, the thermally conductive layer may provide other benefits to motor performance including stabilizing the stator position relative to the motor housing, damping stator vibration and/or providing a flame retardant layer. The thermally conductive layer may be applied or configured in such a manner that the stator may be slip fit to the motor housing during assembly, thus minimizing stress to the stator laminations which may result from interference of the stator laminations with the housing, either during motor assembly or in use due to, for example, vibration and/or thermal expansion of the motor components including the stator laminations.

A method of making the motor housing assembly including a method of forming the thermally conductive layer is provided, where the thermally conductive layer is distributed in a gap between the stator and the motor housing. The thermally conductive layer is configured to transfer heat from the stator to the motor housing to cool the motor in operation. The thermally conductive layer may also be configured to stabilize the position of the stator in the motor housing, which may, for example, dampen vibration and reduce fatigue stress on the motor components including the stator windings. The motor housing assembly may be configured for use with any type of electric motor including traction motors. In one example, the motor may be configured as a traction motor for use in a vehicle, which may be a hybrid vehicle or electric vehicle.

A motor housing assembly and a method for making the motor housing assembly is provided. The motor housing assembly includes a housing configured to receive a stator, and a stator positioned in the housing to define a fillable gap defined by the stator and an interior surface of the housing adjacent the stator. A polymeric layer is formed by dispensing a polymeric based material into the fillable gap such that the polymeric based material when distributed within the gap and cured partially fills the gap to form a polymeric layer in contact with the housing and stator. The polymeric layer is configured as a thermally conductive layer, having a thermal conductivity greater than the thermal conductivity of air, such that the polymeric layer is configured to transfer heat from the stator to the housing to contribute to cooling of the motor in use.

The stator defines an exterior surface which is adjacent the interior surface of the housing. The polymeric layer is formed such that the polymeric layer is in contact with at least half of the exterior surface of the stator, and preferably in contact with at least 80% of the exterior surface of the stator, to provide a heat transfer interface equal to 50% or more of the exterior surface of the stator. The polymeric layer is made of a polymer based material having a thermal conductivity in plane of at least 0.5 W/mK, or preferably a thermal conductivity in plane of at least 8 W/mK. The polymer based material may include a metallic filler configured to increase the thermal conductivity of the polymeric layer and/or increase the flow characteristics of the polymer based material. The polymeric layer may be configured as a flame retardant layer, to adhere the stator to the housing, and/or to dampen vibration to reduce stress loading of the stator.

A method of making the motor housing assembly includes positioning a stator within a motor housing to define a gap between an exterior surface of the stator and an interior surface of the motor housing, dispensing a flowable polymeric material into the gap in contact with the exterior surface of the stator and the interior surface of the housing adjacent the exterior surface of the stator, and curing the flowable polymeric material to form a thermally conductive polymeric layer configured to transfer heat between the stator and the housing. One or both of the stator and housing may be preheated prior to dispensing the flowable polymeric material into the gap, and/or the polymeric material may include a flow enhancing filler or be configured as a high flow polymer to assist distribution and flow of the polymeric material into the gap.

In one example, the housing defines at least one port in communication with the gap, and the method of making includes dispensing the flowable polymeric material into the gap by injecting the flowable polymeric material through the at least one port into the gap. The port may be configured to receive a fitting such that the flowable polymeric material may be injected into the gap through the fitting to provide a polymeric layer characterized by a flow pattern originating from the port. One or more ports may be defined by the housing to distribute the polymeric material in contact with at least half of the surface area of the exterior surface of the rotor. The method may include controlling the quantity of flowable material dispensed into the gap such that distribution of the flowable material is contained to the exterior surface of the rotor.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 3A schematic cross-sectional view of the section 3A-3A of FIG. 2 including injector ports defined by the motor housing;

FIG. 3B is a schematic cross-sectional view of section 3B-3B of FIG. 3A;

FIG. 3C is a schematic partial view of FIG. 3B including a fitting for flowing polymeric material between the stator assembly and motor housing to form the thermally conductive layer;

DETAILED DESCRIPTION

Figure 1:
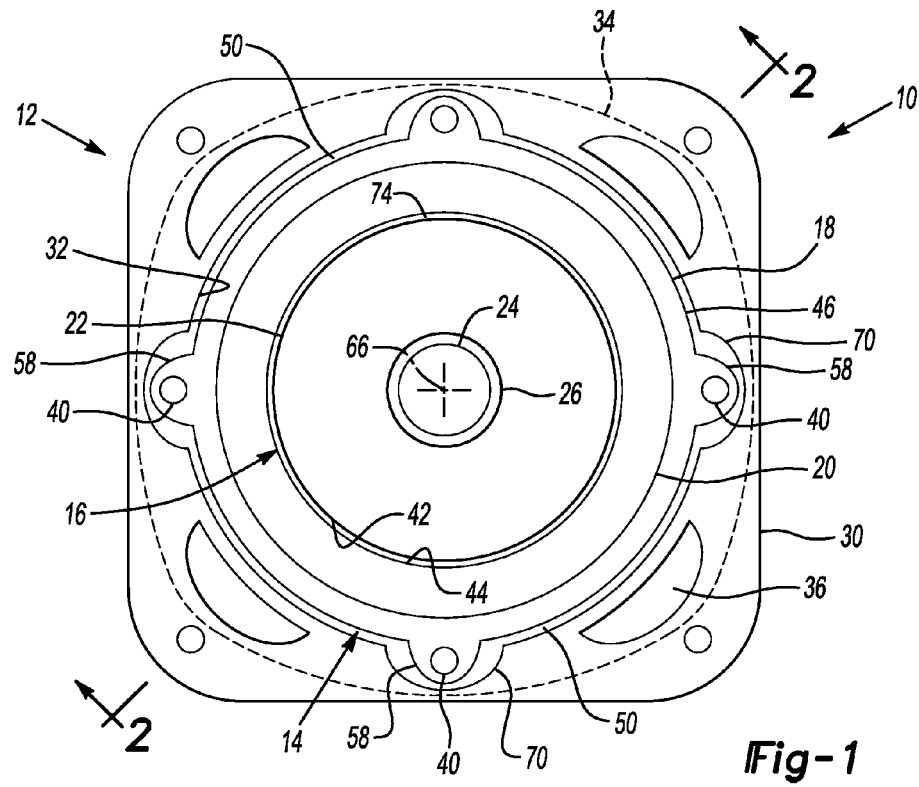
FIG. 1 is a schematic top view of a motor assembly including a stator assembly and motor housing defining a gap therebetween.
Figure 2:
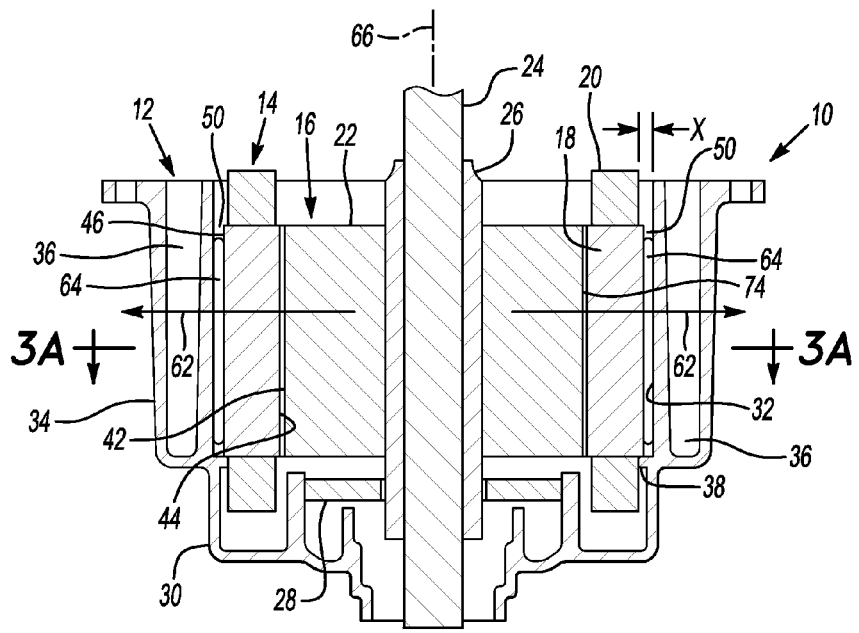
FIG. 2 is a schematic cross-sectional view of section 2-2 of FIG. 1 showing a thermally conductive layer between the stator assembly and motor housing.

Referring to the drawings wherein like reference numbers represent like components throughout the several figures. The elements shown in FIGS. 1-4B are not to scale or proportion. Accordingly, the particular dimensions and applications provided in the drawings presented herein are not to be considered limiting. Referring to FIGS. 1 and 2, a motor, also referred to herein as a motor assembly, is shown generally indicated at 10. The motor 10 may be configured as any type of electrical motor. In a non-limiting example, the motor 10 may be configured as a traction motor for use in a vehicle, which may be a hybrid vehicle or electric vehicle. The motor assembly 10 includes a motor housing assembly generally indicated at 12 and configured to receive a rotor assembly generally indicated at 16. The motor housing assembly 12 includes a motor housing 30, also referred to herein as a housing, and a stator assembly generally indicated at 14. The stator assembly 14 may be operatively attached to the housing 30. The motor housing assembly may be configured to use with any type of electric motor including traction motors. In the non-limiting example shown, the rotor assembly 16 may include a rotor, also referred to as a rotor core 22 fixedly mounted to a shaft 24, for example, via a bushing 26. The rotor core 22 defines a generally cylindrical exterior surface 42. For clarity of illustration, details of the rotor assembly 16, such as rotor windings, are not provided. The rotor assembly 16 is configured to be rotatably mounted relative to the motor housing assembly 12, e.g., relative to the stator assembly 14 and the housing 30. In the example shown, a rotor bearing 28 is operatively connected to the housing 30 and configured to rotatably receive one end of the motor shaft 24 to position the rotor assembly 16 relative to the housing 30, the stator assembly 14, and/or a reference axis 66. The reference datum 66 may establish a datum from which the relative positions of the interior surface 32 of the housing 30, the rotor bearing 28, the stator assembly 14 and the rotor assembly 16 are defined, and/or may correspond to or be defined by an operational or physical characteristic of the motor assembly 12 such as the axis of the rotor assembly 16, the axis of the stator assembly 14, etc. A second housing (not shown) may be attached to the flanged end of the motor housing 30, and may be configured to receive the other end of the motor shaft 24 to rotatably mount the rotor assembly 16 relative to the housing 30 and/or to establish the reference datum 66.

The stator assembly 14 includes a stator core 18, also referred to herein as the stator, and stator windings 20. For clarity of illustration, details of the windings 20 are not provided. The stator 18 defines a generally cylindrical interior surface 44 and an exterior surface 46 extending the axial length of the stator 18. The housing 30 defines an interior surface 32 configured to receive the stator assembly 14 such that the stator assembly 14 can be slip fit into the housing 30, e.g., can be positioned in the housing 30 without interfering contact between the stator exterior surface 46 and the housing interior surface 32. The stator assembly 14 is positioned in the housing 30 and fixedly attached to the housing 30 to define a clearance gap 50, also referred to herein as a fillable gap, between the exterior surface 46 of the stator 18 and the interior surface 32 of the housing 30, and to define an air gap 74 between the stator inner surface 44 and the rotor outer surface 42 such that the rotor assembly 16 is rotatable relative to the stator assembly 14 in use.

In the example shown, the stator assembly 14 may be fixedly attached to the motor housing 30 by a plurality of fasteners 40 extending axially through a plurality of stator portions 58 and operatively attached (not shown) to the housing 30 to retain the stator assembly 14 in the position defining the fillable gap 50 and the air gap 74. The fasteners 40 may be configured as bolts fixedly attachable to the housing by nuts (not shown) or configured as another form of fastener suitable for operatively attaching the stator assembly 14 to the housing 30 in a fixed position. The interior surface 32 of the housing 30 in the example shown includes recesses 70 configured to receive respective stator portions 58, such that the fillable gap 50 is defined in part by the portion of the surface 46 defined by each stator portion 58 adjacent the portion of the surface 32 defined by the respective recess 70 receiving the stator portion 58. It would be understood that the example shown is non-limiting, and other configurations of the stator assembly 14 and/or housing 30 are possible to enable attaching the stator assembly 14 to the housing 30 so as to define the fillable gap 50 therebetween.

The fillable gap 50 defined by the stator exterior surface 46 and the portion of the housing interior surface 32 adjacent the stator exterior surface 46 extends the axial length of the stator 18. A flowable polymeric material 60 is dispensed into the fillable gap 50 and is cured to form a polymeric layer 64 disposed between the stator outer surface 46 and the housing interior surface 32 and such that the polymeric layer 64 is in contact with the stator exterior surface 46 and the housing interior surface 32, as described in further detail herein. The polymeric layer 64 displaces air, which is a relatively poor thermal conductor, from the fillable gap 50 to provide a thermally conductive layer between the housing interior surface 32 and the stator exterior surface 46. The polymeric layer 64 which replaces the displace air in the fillable gap 50 is characterized by a thermal conductivity which is greater than the thermal conductivity of air, such that the polymeric layer 64 increases the rate of heat transfer from the stator 18 to the housing 30 relative to the rate of heat transfer in the absence of the polymeric layer 64, e.g., increases the rate of heat transfer relative to the rate of heat transfer when the fillable gap 50 is filled with air. The thermally conductive polymeric layer 64 is configured to facilitate the transfer of heat generated from the stator and rotor assemblies 14, 16 in operation radially outward through the housing interior surface 32 to the housing exterior surface 34, along the radial heat transfer paths generally indicated at 62.

The fillable gap may be characterized by a gap width 76 (see FIG. 3C). The gap width 76 may vary circumferentially within a housing assembly 12, due to variability in the housing interior surface 32, positioning of the stator 18 relative to the housing interior surface 32 and/or the reference datum 66 and/or positioning of stator 18 relative to the rotor assembly 16 to establish the air gap 74 between the rotor assembly 16 and stator assembly 14. Because the polymeric layer 64 is in contact with the stator exterior surface 46 and the housing interior surface 32, it would be understood that the thickness of the polymeric layer 64 at any radial location corresponds and/or is determined by the gap width 76 at that radial location, such that the thickness of the polymeric layer 64 is equivalent to the gap width 76.

Preferred or required minimum and maximum tolerances or values for the gap width 76 may be influenced by or correspond to a number of factors, including, for example, the configuration of and assembly process for the motor, the materials comprising the housing 30 and/or the stator 18, the heat transfer objectives for or maximum operating temperature limits of the motor 10 in operation, etc. For example, a preferred minimum value of the gap width 76 may correspond to the minimum clearance required to insert the stator assembly 14 into the housing 30 such that the stator assembly 14 can be slip fit relative to the housing interior surface 32, e.g., such that there is clearance and/or non-interference between the housing interior surface 32 and the exterior surface 46 of the stator 18, thus minimizing stress to the stator laminations (not shown in detail) comprising the stator 18, including minimizing stress which may result from interference of the stator 18 with the housing 30, either during assembly of the motor 10 or in use due to, for example, vibration and/or thermal expansion of the motor components including the stator 18. The preferred gap width 76 may correspond to a thickness and compressibility of the polymeric layer 64 required to absorb vibration and/or thermal expansion of the stator 18 during operation, to reduce stress on the stator 18 and/or windings 20, such that the reduction of stress may improve the durability of the motor 10.

The minimum and maximum tolerances, e.g., values, designated for the gap width 76 may be determined by the flow and cure characteristics of a polymeric material 60 dispensed into the fillable gap 50 to form the polymeric layer 64. For example, the minimum required gap width 76 may correspond to a gap width value through which the polymeric material 60 is flowable in the fillable gap 50 during forming of the polymeric layer 64, such that the polymeric material 60 can be flowed in a specified distribution pattern on or to provide minimum coverage of the stator exterior surface 46. The maximum desirable gap width 76 may correspond to a gap width value, which if exceeded, may affect formation of the polymeric layer 64, for example, by affecting the cure cycle or the bonding or adhesion of the polymeric layer 64 to at least one of the surfaces 32, 46.

The motor assembly 10 in use, e.g., during operation of the motor assembly 10, may generate heat which must be transferred away from the motor assembly 10 to maintain the motor assembly 10 within an acceptable operating temperature range. The minimum and/or maximum tolerances or preferred values for the gap width 76 may be determined by the thermal conductivity characteristics of the polymeric material 60 in combination with the heat transfer objectives established for the motor 10 in operation, such that the thickness of the polymeric layer 64 determined by the gap width 76 corresponds to or provides the level of heat transfer required by the motor 10 in operation. In one example, the gap width 76 may have a typical value ranging from 1.5 mm to 2.0 mm, however this example is not limiting and configurations resulting in other gap widths are possible.

In the example shown, the housing 30 may include one or more coolant passages 36 through which a coolant (not shown) may be circulated during operation of the motor assembly 10, to facilitate heat transfer out of and/or away from the motor assembly 10. As shown in FIGS. 1-2, each of the coolant passages 36 may be formed in the housing 30 between the housing outer surface 34 and the housing inner surface 32, to facilitate heat transfer from the stator and rotor assemblies 14, 16 radially outward through the interior surface 32 via the coolant passages 36 to the exterior surface 34, along the radial heat transfer paths 62. The polymeric material 60 may be distributed in the fillable gap 50 such that the polymeric layer 64 is formed adjacent to each of the coolant passages 36, to increase heat transfer by the coolant passages 36 during motor operation.

The polymeric material 60 is made of a flowable polymer based material configured to be dispensable into the fillable gap 50, and curable to form the thermally conductive polymeric layer 64. Where used herein, thermal conductivity refers to the thermal conductivity measured in plane in Watts per meter·Kelvin (W/mK). The polymeric material 60 may be characterized by a thermal conductivity greater than the thermal conductivity of air. For reference, the thermal conductivity of air is 0.024 W/mK. The polymeric material 60 may have a thermal conductivity of at least 0.25 W/mK, preferably a thermal conductivity of at least 1.0 W/mK, and more preferably a thermal conductivity of at least 8 W/mK. For example, the polymeric material 60 may include a nylon based or polyamide based material having a thermal conductivity of 0.25 W/mK. For example, the polymeric material 60 may be a thermally conductive material such as one of Stanyl® TC154A, TC153, TC501, and TC551 having a thermal conductivity of 1 W/mk, 8 W/mK, 14 W/mK, and 14 W/mK, respectively.

The polymeric material 60 may be a polymer based material including a filler material having a thermal conductivity greater than the base polymer, e.g., the polymer or polymers used to provide the polymer base to the polymer based material, such that the filler material increases the thermal conductivity of the polymeric material 60 relative to the base polymer. The filler material may include a metal based material and/or be configured to enhance the flow of the polymeric material 60 during dispensing of the polymeric material 60 into the fillable gap 50. In one example, the filler material may contain at least one of an aluminum based material, a titanium based material, and a magnesium based material. For example, the filler material may be a metallic filler such as INTEC SB 94® having a thermal conductivity of 20 W/mK. By providing the thermally conductive layer 64 in contact with the stator exterior surface 46 and the housing interior surface 32, heat transfer from the motor is improved, which may provide benefits to motor performance including improved motor efficiency and durability, decreased potential for overheating and thermal stress, and/or an increase in the operating torque limit of the motor.

The polymeric material 60 may be configured as a flowable material, which may include flow enhancers and/or cure cycle modifiers such that the polymeric material 60 is a high flow material with a cure cycle which facilitates injection, flow and distribution of the polymeric material 60 into the fillable gap 50, such that the polymeric layer 64 is formed in contact with at least half of the exterior surface of the stator, e.g., at least 50% of the fillable gap is filled by the polymeric layer 64 in contact with the housing 30 and the stator 18 to provide a heat transfer interface equal to 50% or more of the exterior surface 46 of the stator 18. Preferably, the polymeric layer 64 is in contact with and/or distributed across at least 80% of the exterior surface 46 of the stator 18.

The polymeric material 60 may be configured to provide other benefits to motor performance including flame retardation, stabilizing the stator position relative to the motor housing, and/or damping stator vibration. For example, the polymeric material 60 may be configured as a flame retardant material or may include a flame retardant filler. The polymeric material 60 may be configured to bond and/or adhere to the housing interior surface 32 and to the stator exterior surface, such that the polymeric layer 64 forms an adhesive layer to adhere the stator 18 to the housing 32. The polymeric layer 64 may be characterized as a dampening layer to absorb or dampen vibration of the motor 10 in operation, which may increase motor durability, reduce fatigue stress on motor components including the windings 20, and/or reduce motor noise during operation. The polymeric layer 64 may be configured to be compressible such that thermal expansion of the stator 18 and/or housing 30 may compress the polymeric layer 64 and prevent or minimize interfering contact of the stator 18 and the housing 30 during vibration or thermal expansion of the motor 10, thus minimizing stress on motor components including the stator assembly 14 in operation.

A method of making the motor assembly housing assembly 12, including forming the polymeric layer 64, is provided herein. The method includes positioning the stator assembly 14 within the motor housing 30 to define the fillable gap 50 between the exterior surface 46 of the stator 18 and the interior surface 32 of the motor housing 30, which may include, as described previously, operatively attaching the stator assembly 14 to the motor housing 30, by a plurality of fasteners 40 or other suitable means. The flowable polymeric material 60 is dispensed into the fillable gap 50 such that the flowable polymeric material 60 is distributed across the stator exterior surface 46 within the fillable gap 50 to form the polymeric layer 64 in contact with the stator exterior surface 46 and the housing interior surface 32 adjacent the stator exterior surface 46.

The method may include curing the flowable polymeric material 60 to form the polymeric layer 64. The polymeric layer 64 may bond to the stator exterior surface 46 and the housing interior surface 32 during dispensing and/or curing. The polymeric layer 64, as described previously in detail herein, may be distributed in the fillable gap 50 and/or configured in a distribution pattern to transfer heat between the stator 18 and the housing 30, to dampen vibration, as a flame retardant, and/or to adhere the stator exterior surface 46 to the housing interior surface 32. One or both of the stator assembly 14 and the housing 30 may be preheated prior to dispensing the flowable polymeric material 60 into the fillable gap 50, to facilitate flow and/or distribution of the polymeric material 60 in the fillable gap and/or on or relative to the exterior surface 46 of the stator 18. The polymeric material 60 may include a flow enhancing filler or be configured as a high flow polymer to assist distribution and flow of the polymeric material 60 in the fillable gap 50.

Referring now to FIGS. 3A-3C, in the non-limiting example shown the housing 32 defines one or more ports 48 extending from the housing exterior surface 34 to the housing interior surface 32 and in communication with the fillable gap 50. In the example shown, the port 48 may be configured to receive a dispensing nozzle 52, wherein the dispensing nozzle 52 is configured to dispense the flowable polymeric material 60 into the fillable gap 50. The temperature, pressure, flow rate and/or quantity of the polymeric material 60 dispensed through the nozzle 52 may be controlled within predefined parameters corresponding to the desired distribution pattern of the polymeric layer 64 to be formed therefrom and/or as required by the flow, cure and/or material characteristics or other properties of the polymeric material 60. The port 48 and/or the nozzle 52 and/or the method of dispensing the polymeric material 60 may be configured such that polymeric material 60 seals or forms a seal in the port 48 during forming of the polymeric layer 64, e.g., such that the one or more ports 48 are self-sealing as a result of the process of dispensing and/or curing the polymeric material 60.

The method of forming the polymeric layer 64 may include dispensing the flowable polymeric material 60 into the fillable gap 50 by injecting the flowable polymeric material 60 through at least one port 48 and into the fillable gap 50, such that the injected polymeric material 60 flows through the fillable gap 50 and is distributed across the exterior stator surface 46 in contact with the housing interior surface 32 adjacent the exterior stator surface 46. The number and configuration of the one or more ports 48 may be varied such that the polymeric material 60 is dispensed into the fillable gap 50 in a distribution pattern configured to achieve at least 50% coverage of the stator exterior surface 46 and/or to fill at least 50% of the volume of the fillable gap 50. The polymeric layer 64 formed by dispensing the polymeric material 60 through one or more ports 48 may be characterized by a flow pattern originating from one or more ports 48.

To prevent migration of the flowable polymeric material 60 to other areas of the motor assembly 10, the number and/or location of the one or more ports 48 may be varied to provide a distribution pattern of the polymeric material 60 such that the polymeric layer 64 formed therefrom is contained within the perimeters of the stator exterior surface 46, e.g., the polymeric layer 64 does not extend beyond the axial ends of the stator exterior surface 46. For example, the one or more ports 48 may be located such that each port 48 is in fluid communication with a central portion of the stator exterior surface 46 via an aperture 56.

In a non-limiting example shown in FIGS. 2 and 3B, the housing 30 may include a containment feature 38 which may be configured to contain flow of the polymeric material 60 within the fillable gap, to prevent migration or flow of the polymeric material 60, for example, to the stator windings 20 and/or to other areas of the motor assembly 10, including migration into the air gap 74 and/or onto parts of the motor 10 including the shaft 24 and rotor assembly 16 which are movable in operation. The containment feature 38 may be defined by the housing 30, e.g., integrally formed as part of the housing 30, or may be an insert operatively attached to or positioned within the housing 30.

The quantity of polymeric material 60 dispensed into the fillable gap 50 may be metered or otherwise controlled such that distribution of the polymeric material 60 and the distribution pattern of the polymeric layer 64 formed therefrom is contained to the stator exterior surface 46 and provides coverage of at least 50% of the stator exterior surface 46 without extending beyond the perimeter of the stator exterior surface 46. The quantity of polymeric material 60 and/or the number and location of the one or more ports 48 may be configured such that the flowable polymeric material 60 flows into the portion of the fillable gap 50 adjacent the coolant passage 36, and/or flows into the portion of the fillable gap 50 defined by the stator portions 58 and housing recesses 70, to provide a thermally conductive polymeric layer 64 in these areas. The quantity of polymeric material 60 dispensed through the port 48 may be metered or otherwise controlled such that a quantity of the flowable polymeric material 60 is retained by and/or residual in the port 48 to form a sealing plug 68, as shown in FIG. 3A, to prevent the ingression of moisture, contaminants or other substances into the interior of the housing 30. The sealing plug 68 may be integral to the polymeric layer 64, e.g., formed continuously with the polymeric layer 64, such that the sealing plug 68 may operatively connect or attach the polymeric layer 64 to the housing 30.

As shown in FIG. 3C, the port 48 may be configured to receive a fitting 72 configured such that the flowable polymeric material 60 may be injected into the fillable gap 50 through the fitting 72. The fitting 72 may be configured to interface with the dispensing nozzle 52, such that the nozzle 52 may be placed in selective fluid communication with the fitting 72 to dispense the polymeric material 60 into the fillable gap 50. In one example, the fitting 72 may be a zerk-type fitting, commonly referred to as a zerk, configured to receive the dispensing nozzle 52. The fitting 72 and the port 48 may be configured as required to operatively retain the fitting 72 to the port 48 during dispensing of the flowable polymeric material 60. For example, each of the port 48 and fitting 72 may each be threaded to provide a threaded connection. The port 48 and fitting 72 may be configured by tolerancing, knurling, etc., to provide an interference fit, also referred to as a press fit, therebetween during installation to retain the fitting 72 to the port 48. The fitting 72 may include a method for sealing after dispensing of the polymeric material 60 through the fitting 72 and port 48. For example, the fitting 72 may include a check ball of the type used in zerk-type fittings. As discussed previously, the polymeric material 60 may form a sealing plug 68 to seal the fitting 72 and/or port 48 during formation of the polymeric layer 64.

The polymeric material 60 may include a flow enhancer to facilitate flow of the polymeric material 60 through the port 48, nozzle 52 and/or fitting 72. A plurality of nozzles 52 and/or the motor housing assembly 12 may be configured in a fixture (not shown) such that the polymeric material 60 can be flowed concurrently through the plurality of nozzles 52 into the plurality of ports 48 and/or through the plurality of fittings 72. In one example, each of the plurality of nozzles 52 may be in fluid communication with a common source (not shown) of the polymeric material 60, such that the characteristics of the polymeric material 60 flowing through the plurality of nozzles 52, such as material composition, flow rate, dispensing temperature, thermal conductivity, etc., is substantially the same, to provide uniformity in the characteristics of the polymeric layer 64 formed therefrom.

Additional containment features (not shown) may be provided to and/or included in the motor assembly 10, and/or defined by the housing 30 or stator assembly 14, and configured to contain the polymeric material 60 within the fillable gap 50. The additional containment features may be in additional to or substitutional of the containment feature 38, and/or may be selectively removable from the motor assembly 10 after formation of the polymeric layer 64. In a non-limiting example shown in FIGS. 4A-4B, an insert 54 may be positioned an end of the stator 18 to at least partially enclose the fillable gap 50 during dispensing of the polymeric material 60. As shown, the insert 54 may be configured to generally conform to the outermost surface of the windings 20 and the housing interior surface 32, such that the insert encloses one end of the fillable gap 50. An assembly clearance (not shown) may be provided between the radially innermost edge of the insert 54 and the windings 20, such that the insert 54 may be placed in direct contact with, e.g., directly on, the end surface of the stator core 18. In another example, the stator core 18 be configured from plurality of stacked laminations (not shown), wherein the end lamination of the stator core 18 may be configured as the insert 54, such that the insert 54 is integral to the stator core 18. In this configuration is would be understood that the insert 54 would include, for example, openings to receive the fasteners 40 to attach the stator core 18 including the insert 54 in a position relative to the housing interior surface 32.

Figure 4A:
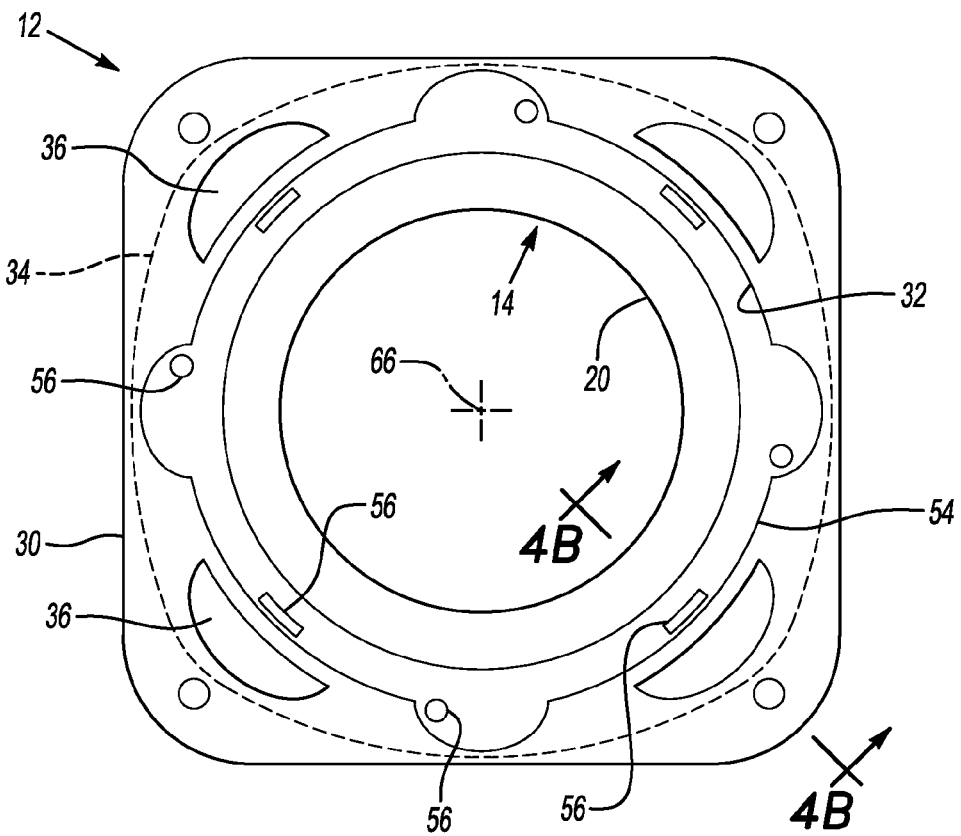
FIG. 4A is a schematic top view of the motor housing and stator assembly of FIG. 1 including an injector fixture.
Figure 4B:
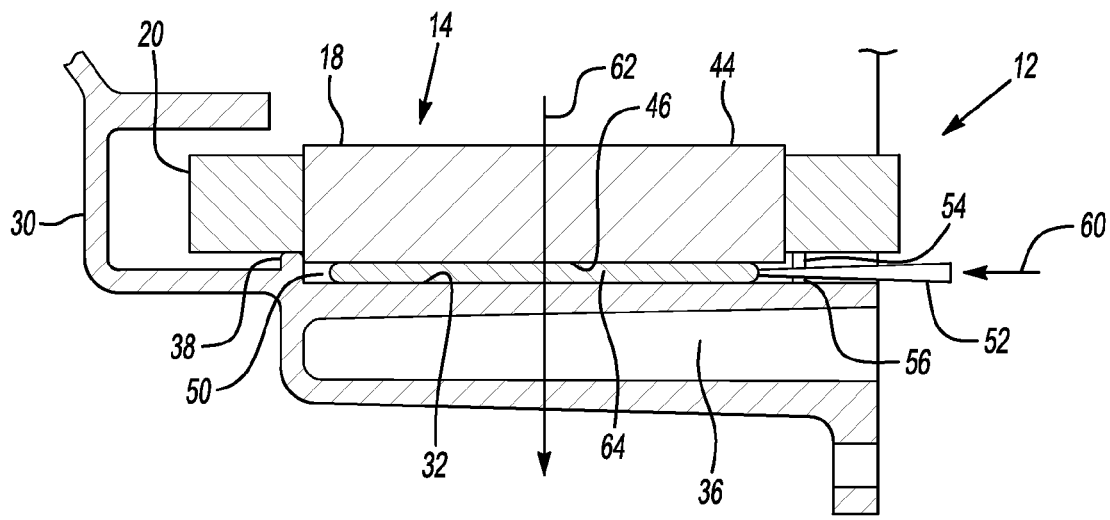
FIG. 4B is a schematic cross-sectional view of section 4B-4B of FIG. 4A.

The insert 54 may include one or more apertures 56. The one or more apertures 56 may each be configured to receive a dispensing nozzle 54 configured to interface with the respective aperture 56 to dispense polymeric material 60 into the fillable gap 50. As shown in FIG. 4A, the configuration, number, and/or location of the apertures 56 may be varied, as discussed previously related to the ports 48, to provide a distribution pattern of the flowable polymeric material 60 in the fillable gap 50 to fill the fillable gap 50 at least 50% with the polymeric material 60 and to form a polymeric layer 64 which covers and/or is in contact with at least 50% of the stator exterior surface 46 and the housing interior surface 32 adjacent the stator exterior surface 46. The configuration, number, and/or location of the apertures 56 may be varied, as discussed previously related to the ports 48, to provide a distribution pattern of the polymeric material 60 which is contained with the perimeter of the stator exterior surface 46, and/or provides a polymeric layer 64 which may be characterized by a flow pattern corresponding to the pattern of apertures 56. Various sizes and configurations of nozzles 52, including for example, round and/or blade nozzles 52, may be used in combination with the insert 54 to dispense the flowable polymeric material 60 into the fillable gap 50. One or more of the nozzles 52 may be configured to extend into the fillable gap 50, as shown in FIG. 4B, such that the dispensing end of the nozzle 52 is located within the perimeter of the exterior surface 46 of the stator prior to dispensing the polymeric material 60, to direct the flow of polymeric material 60 to a central portion of the exterior surface 46 and/or contain the distribution pattern of the polymeric layer 64 within the perimeter of the stator exterior surface 46.

A plurality of nozzles 52 and/or the motor housing assembly 12 may be configured in a fixture (not shown) such that the polymeric material 60 can be flowed concurrently through the plurality of nozzles 52 into the fillable gap 50. In one example, each of the plurality of nozzles 52 may be in fluid communication with a common source (not shown) of the polymeric material 60, such that the characteristics of the polymeric material 60 flowing through the plurality of nozzles 52, for example, the material composition, flow characteristics, dispensing temperature, thermal conductivity, etc., is the same, to provide uniformity in the characteristics of the polymeric layer 64 formed therefrom.

While the best modes for carrying out the invention have been described in detail, those familiar with the art to which this invention relates will recognize various alternative designs and embodiments for practicing the invention within the scope of the appended claims.

The invention claimed is:

1. A method of making a motor housing assembly, the method comprising:
    attaching a stator to a motor housing to form the motor assembly and to provide a fillable gap defined by an exterior surface of the stator and an interior surface of the motor housing;
    wherein the motor housing defines at least one port in communication with the fillable gap;
    wherein the at least one port is configured to receive a check fitting;

fitting the check fitting to the at least one port;

dispensing a flowable polymeric material into the fillable gap by injecting the flowable polymeric material into the fillable gap through the check fitting and through the at least one port such that the flowable polymeric material is in contact with the exterior surface of the stator and the interior surface of the motor housing adjacent the exterior surface of the stator; and curing the flowable polymeric material to form a polymeric layer having a thermal conductivity greater than the thermal conductivity of air.

2. The method of claim 1, wherein the flowable polymeric material is one of a polyamide material and a polymeric material including a metallic filler.

3. The method of claim 1, further comprising:
heating at least one of the stator and the motor housing prior to dispensing the flowable polymeric material into the fillable gap.

4. The method of claim 1, further comprising:
controlling the quantity of flowable polymeric material dispensed into the fillable gap such that distribution of the flowable material is contained to the exterior surface of the stator.

5. The method of claim 1, wherein dispensing the flowable polymeric material into the fillable gap includes distributing the polymeric material to fill at least 50% of the fillable gap.

6. The method of claim 1, wherein the motor housing defines a containment feature configured to contain the flowable polymeric material within the fillable gap.

* * * * *